(No Model.) 2 Sheets—Sheet 1.

A. TURNBULL.
WEIGHING SCALE.

No. 378,382. Patented Feb. 21, 1888.

Witnesses
J. H. Shumway
Fred C. Earl

Andrew Turnbull, Inventor
By atty.

(No Model.) 2 Sheets—Sheet 2.

A. TURNBULL.
WEIGHING SCALE.

No. 378,382. Patented Feb. 21, 1888.

Witnesses:
J. N. Shumway
Fred C. Earle

Andrew Turnbull, Inventor,
By atty, John C. Earle.

UNITED STATES PATENT OFFICE.

ANDREW TURNBULL, OF NEW BRITAIN, CONNECTICUT.

WEIGHING-SCALE.

SPECIFICATION forming part of Letters Patent No. 378,382, dated February 21, 1888.

Application filed April 25, 1887. Serial No. 236,051. (No model.)

*To all whom it may concern:*

Be it known that I, ANDREW TURNBULL, of New Britain, in the county of Hartford and State of Connecticut, have invented a new Improvement in Weighing-Scales; and I do hereby declare the following, when taken in connection with accompanying drawings and the letters of reference marked thereon, to be a full, clear, and exact description of the same, and which said drawings constitute part of this specification, and represent, in—

Figure 1:
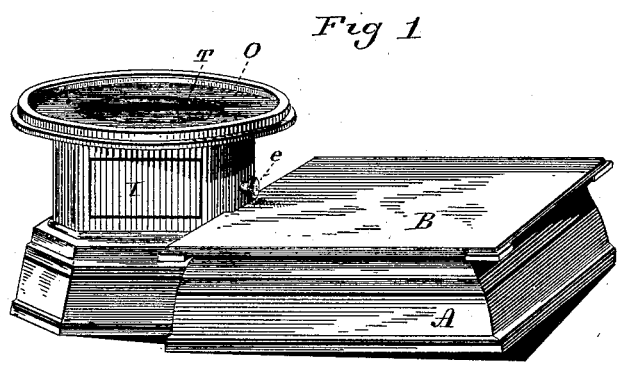
Figure 2:
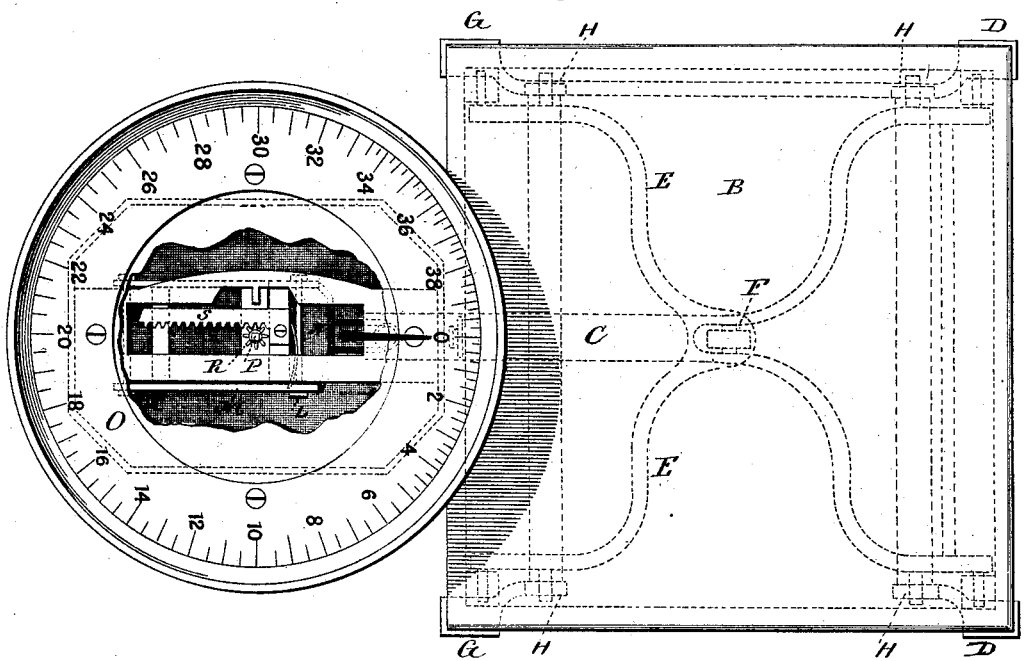
Figure 3:
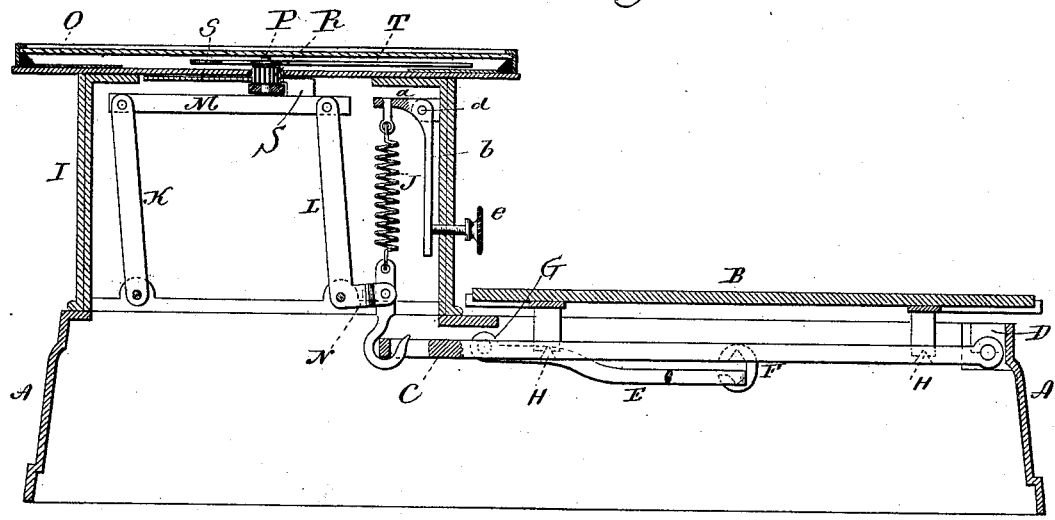
Figure 4:
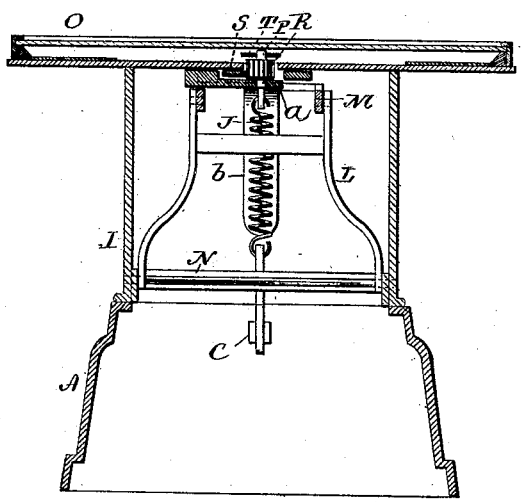

Figure 1, a perspective view of the scale complete; Fig. 2, a top or plan view, a portion of the dial broken away to show the mechanism beneath; Fig. 3, a vertical sectional side view; Fig. 4, a transverse vertical section centrally through the dial.

This invention relates to an improvement in that class of scales commonly called "platform-scales," or such as employ a beam upon which an indication of the weight is made.

The object of this invention is to provide a stationary dial in a horizontal plane—that is, a plane parallel with the platform—with a pointer thereon, a resisting-spring in connection with the levers which support the platform, and mechanism between said levers and the pointer, whereby the amount of resistance of the spring under the action of the system of levers will be indicated on the said horizontal dial, and in such a scale as hereinafter described, and more particularly pointed out in the claims, my invention consists.

A represents the base, upon or within which the operative mechanism of the scale is arranged. Within the base the usual system of levers for the support of the platform B is arranged.

C represents the principal lever, which is bifurcated at one end, the two arms resting in bearings D in the base, the other or single arm extending beyond the platform. The second lever, E, is of similar shape, the two arms connected at one end and hung to the principal lever C, as at F, the two ends of the lever E supported in bearings G in the base in the usual manner. The platform rests on the four arms of the two levers at points H H, also in the usual manner.

At one end of the base is a frame, I, in which a vertical spring, J, is hung by its upper end, the lower end connected to the single projecting end of the arm C, so that the force applied to the platform resting on the levers will be resisted by the said spring. The leverage is so great that a very light spring forms a great resistance. The action of the spring is in a vertical direction.

Within the frame and on the base a pair of parallel levers, K L, are hung, extending upward, and connected at their upper ends by a bar, M, so that under the swinging movement of the levers K L the bar M will be moved longitudinally in substantially a horizontal plane. From the lever L, which stands next the spring J, an arm, N, extends toward the spring, and is connected to the lever C by the same connection which unites the spring to the lever C, so that the up-and-down vibratory movement of the lever C will impart a corresponding horizontal swinging movement to the levers K L.

Above the frame I, and immovably secured to it, is the horizontal dial O. Centrally through this dial is a vertical shaft, P, supported in the frame below, as shown, so as to revolve freely upon its vertical axis. On this shaft is a pinion, R, and attached to the levers K L is a longitudinal rack, S, toothed corresponding to the pinion R, so as to work therein. This rack partakes of the longitudinal movement of the bar M, which connects the two levers K L, so that under the swinging movement of the levers K L the longitudinal movement of the rack S, connected to said levers, will impart to the shaft P, through the pinion R, a corresponding rotation.

Upon the face of the dial the shaft P carries a pointer, T, which traverses about the dial. The graduations on the dial indicate fractions of, say, pounds; hence, the parts standing in the normal condition, with the pointer at zero, a body placed upon the platform will depress the platform, and through the system of levers and connections will impart a rotation to the pointer on the dial corresponding to the extent of the depression, and this extent of depression is resisted by the spring; hence the indications by the pointer on the dial is the resistance which the spring has offered to the load upon the platform, and the parts being properly arranged, and the graduations on the dial corresponding, the weight will be indicated thereon in like manner as the weight is indicated on other dial-scales.

It is necessary that there shall be some provision for the adjustment of the spring. To do this I arrange a right-angular or bell-crank lever, $a\ b$, upon a pivot or fulcrum, $d$. The upper end of the spring J is secured to one arm, $a$, of the said lever. The other arm extends down inside the frame, and through the frame is an adjusting-screw, $e$, by which the arm $b$ may be forced inward, or permitted to move outward, as the case may be, correspondingly extending or contracting the spring. As the spring is extended under the inward movement of the arm $h$, its power upon the platform is increased, and vice versa. This adjustment will permit the pointer to be brought to zero, which indicates the normal condition of the parts.

The frame I is inclosed, this inclosure forming the base on which the dial rests, as shown.

This class of platform-scales is such as is adapted to be used upon counters or to be transferred to the floor, and in which, in the usual construction, the beam is but a short distance above the platform, while the graduations on such a beam may be conveniently examined on a counter. When placed upon the floor, the beam is so low as to be inconvenient of access, and many times it is impossible to examine the figures on the beam to ascertain the weight, whereas by making the dial stationary in a horizontal plane substantially parallel with the plane of the platform the dial is exposed for examination without the inconvenience attending the examination of the beam, in addition to which is the advantage of the automatic character of the scale, which indicates the weight of the article the instant it is applied to the platform.

It will be understood that in place of the platform a scoop may be applied when that class of scale is preferred. Therefore by the term "platform" I wish to be understood as including any of the known substitutes therefor.

I do not wish to be understood as claiming, broadly, a scale having a horizontal indicating-dial, as such, I am aware, is not new.

I claim—

1. In a weighing-scale, the combination of the base, a system of levers within said base, a platform resting on said levers, a resisting-spring in connection with said levers, levers K L, hung to the base and extending upward, one of said levers, as L, being in connection with the platform-levers, a stationary dial in a horizontal plane and above said levers, a vertical central shaft, P, supported in the frame below the dial and extending up through the dial, a toothed rack in connection with said levers, and a pinion on said shaft, with which said rack engages, substantially as and for the purpose described.

2. The combination of a base, a horizontal system of levers carrying a platform, a vertical spring, one end being connected to the principal lever of said system, a frame extending upward from the base, a bell-crank lever hung in said frame upon a horizontal axis, one arm of said lever extending horizontally inward, the upper end of the spring being fixed to said arm, the other arm of said bell-crank lever extending downward, an adjusting-screw adapted to bear against said other arm for the purpose of adjusting the tension of the spring, a stationary dial supported in said frame and in a horizontal plane, a pointer on said dial, and mechanism substantially such as described between said system of levers and said pointer, substantially as and for the purpose described.

ANDREW TURNBULL.

Witnesses:
C. S. LANDERS,
FRED GOODRICH.